Figure 1:
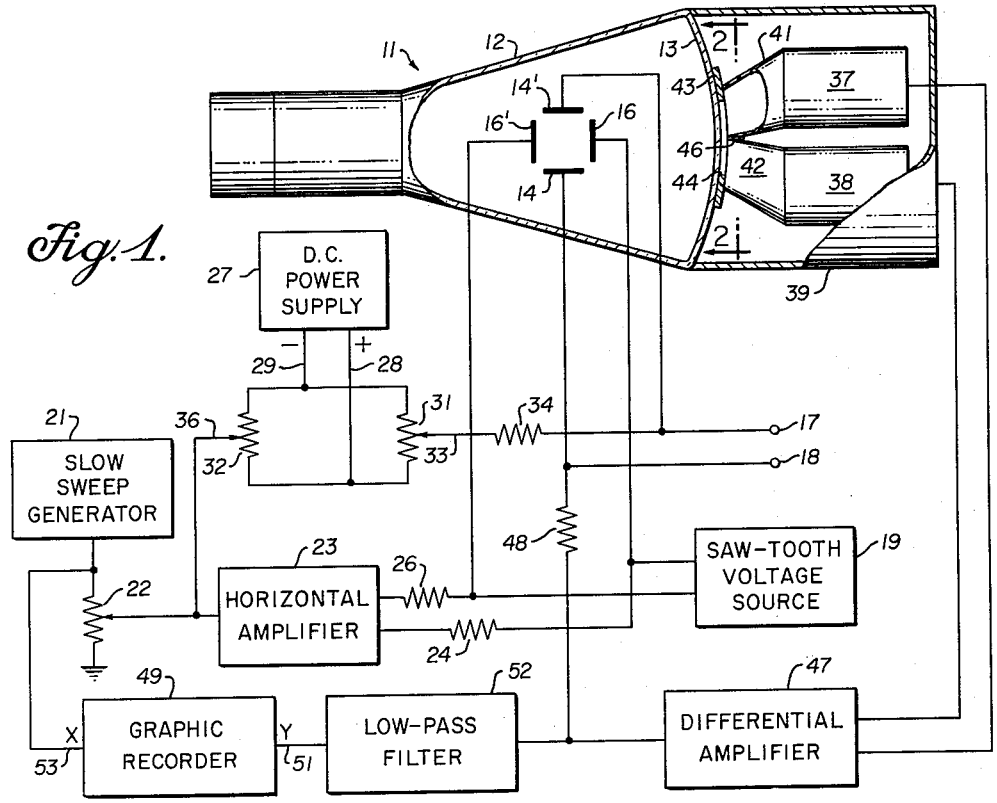

Sept. 26, 1961 Q. A. KERNS 3,001,847
OPTICAL TRANSCRIBING OSCILLOSCOPE
Filed Aug. 12, 1959

INVENTOR.
QUENTIN A. KERNS
BY
ATTORNEY.

3,001,847
OPTICAL TRANSCRIBING OSCILLOSCOPE
Quentin A. Kerns, Orinda, Calif., assignor to the United States of America as represented by the United States Atomic Energy Commission
Filed Aug. 12, 1959, Ser. No. 833,362
15 Claims. (Cl. 346—33)

The present invention relates to apparatus for viewing electronic pulses and more particularly to a rapid acting means for accurately enlarging and tracing the waveforms of very fast pulses.

In fast pulse circuitry a major obstacle has been the difficulty associated with obtaining an accurate visible representation of particular pulse wave shapes. When these fast signals are applied to a cathode ray oscilloscope, the device by means of which electrical waves are generally viewed, the pattern appearing on the screen may be barely detectable and thus too small to provide any detailed knowledge thereof. If the fast pulse signal is electrically amplified to produce an enlarged pattern of the waveform on the screen, the non-linearity of the amplifiers in this high frequency range produces distortion in the enlarged wave shape of the signal.

A magnified reproduction of the true wave shape can be obtained by photographing the unamplified waveform as it appears on the oscilloscope screen and optically enlarging the photographic print. However, since the pulse track is magnified as well as the pulse shape, inaccuracy is inherent in tracing the true center of the magnified track of the pulse. In addition, this method does not effect ready observation of the wave shapes due to the time consumed in the tracing of the track center and in developing the film.

The present invention provides a relatively fast method of producing an accurately enlarged and permanent reproduction of the waveform of very fast pulses. The fast pulse signal, the waveform of which is to be studied, is left unamplified to preserve the exact true wave shape and is applied to the vertical deflection plates of a cathode ray tube. A slow sweep generator is coupled to the horizontal deflection plates of the cathode ray tube to establish a slow tracking rate of the beam thereof. As the pulse is slowly tracked by the cathode ray tube, very narrow horizontal increments of the beam are exposed to a pair of similar detector tubes sensitive to the beam, the detectors being positioned to respond to vertical movement of the beam to each side of a fixed horizontal central reference. In one embodiment of the invention this incremental scanning is effected by shielding the screen of the cathode ray tube with an opaque plate provided with a central vertical slot and disposing a pair of photomultiplier tubes at the plate such that each views one half the length of the slot. In an alternate embodiment, the same effect is achieved by a cathode ray tube having a slotted shielding plate and a pair of electron multiplier tubes included within the vacuum envelope whereby the cathode beam is sensed directly. In each case, each of the pair of detector tubes responds to movement of the cathode ray beam along a Y-axis, and produces an output signal proportional thereto. Any amplitude discrepancy between simultaneous signals from the two detectors thus indicates a vertical deviation of the beam with respect to the fixed horizontal reference. By applying these signals to a differential amplifier such amplitude discrepancies may be detected and an output signal of proper phase and magnitude produced which is coupled back to the vertical deflection plates of the cathode ray tube, to recenter the beam at the reference. As the beam is tracked across the screen and new increments thereof are exposed to the detectors, this continuing process effectively causes the pulse pattern to be traced through the mid-point of the fixed reference. The variations in the vertical beam repositioning signal, synchronized with the tracking time, are then an accurate indication of the waveform. Such signal may be applied to the Y-coordinate input of an X-Y plotter type of graphic recorder while the corresponding X-coordinate input signal is received from the slow sweep generator. The proportionate amplification of both signals to the recorder by the adjustment of the recorder response produces no significant distortion and an accurate enlargement of the wave shape is obtained.

It is accordingly an object of the present invention to provide a superior means of observing very fast electronic pulses.

It is an object of the present invention to provide for accurate and rapid enlargement of fast pulse waveforms.

It is an important object of this invention to provide a means of producing an accurately enlarged graphical trace corresponding to a very fast electronic pulse.

It is another important object of the invention to provide a readily obtained permanent record of a fast pulse wave shape.

It is also an object of the present invention to provide a convenient means of effectively extending the time scale of very fast pulses.

Figure 2:
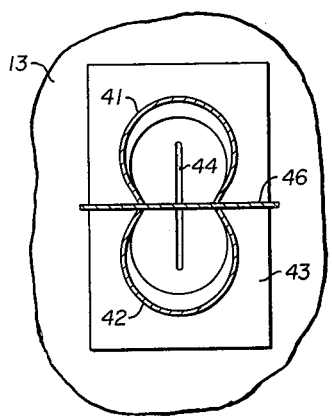
Figure 3:
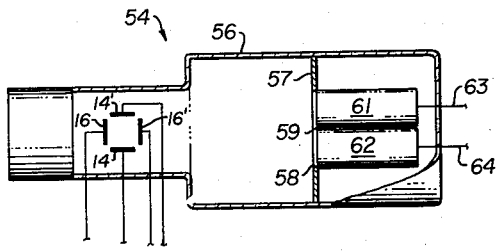

These and other objects of the invention will become apparent in the following description taken in connection with the accompanying drawing, in which:

FIGURE 1 is a partially schematic view showing a first embodiment of the invention, FIGURE 2 is an enlarged view taken along line 2—2 of FIGURE 1 and further clarifying the structures of certain of the components shown therein, and FIGURE 3 is a view showing a modified form of certain of the components of the apparatus of FIGURE 1 which modifications provide a second embodiment of the invention of increased sensitivity and accuracy.

Referring now to FIGURE 1, there is shown a cathode ray oscilloscope tube 11 of conventional design comprising an evacuated flared glass envelope 12 interiorly coated at the broad end with a fluorescent substance to form the oscilloscope screen 13. Suitable filament and electrode potentials to generate the cathode ray beam and the associated operating controls are applied in the conventional manner. A first pair of conventional electrostatic plates 14 and 14′ for deflecting the oscilloscope beam between two vertical limits and a second pair of similar plates 16 and 16′ for deflecting the beam within two horizontal limits are included within the envelope 12 of tube 11.

The fast pulse test signal which is to be enlarged and studied is applied to the vertical deflection plates 14 and 14′ at circuit terminals 17 and 18. A sawtooth voltage to initiate the usual unblanking signal and to establish the repetition rate of the oscilloscope beam is synchronized with the test pulse and applied to the horizontal deflection plates 16 and 16′ from a suitable voltage source 19. To provide a slow tracking voltage to the oscilloscope beam, the output of a slow sweep generator 21 is coupled through an amplitude controlling potentiometer 22 to a D.C. horizontal amplifier 23. The amplified signal is then applied to the horizontal deflection plates 16 and 16′ of tube 11 through voltage adding resistors 24 and 26, respectively.

A D.C. power supply 27, provided with a plus voltage tap 28 and a minus voltage tap 29, is connected across a pair of similar potentiometers 31 and 32. Potentiometer 31 is used for manual vertical positioning of the beam trace on the oscilloscope screen 13 and thus moving contact 33 of the potentiometer is connected to vertical deflection plate 14′ through a series resistor 34.

Potentiometer 32, used for manual horizontal positioning of the beam trace on screen 13, is provided with moving contact 36 which connects to the input of horizontal amplifier 23. In addition, the potentiometers 31 and 32 may be used to establish on the screen only that portion of the test pulse it is desired to trace.

To view the beam track displayed on the oscilloscope screen 13, a pair of identical photomultiplier tubes 37 and 38 are arranged with the first photomultiplier tube disposed above the second photomultiplier tube and the combination centered with respect to screen 13. It is required that the first photomultiplier tube 37 view only the upper half of a narrow central portion of the tube screen and that the second photomultiplier tube 38 view only the lower half or the same narrow portion. Accordingly, the two photomultipiler tubes 37 and 38 are housed in a cylindrical opaque encasement 39, the open end of which abuts the face of oscilloscope tube 11 at the periphery thereof and thereby shields the fluorescent screen from stray light. Light from the oscilloscope beam is directed to the two photomultiplier tubes by a pair of cone-like opaque baffles 41 and 42, respectively, each of which baffles extends from the periphery of a photomultiplier tube face and converges toward the face of the oscilloscope tube 11 to abut an opaque plate 43 positioned centrally thereon.

Referring now to FIGURE 2 in conjunction with FIGURE 1, plate 43 has a curvature to conform with that of the oscilloscope tube face and is provided with a vertically aligned slot 44 at the center which slot serves to expose only a very narrow horizontal section of the test pulse beam. In the present embodiment of the invention slot 44 is approximately one thousandth of one inch wide. A thin horizontal baffle 46, disposed against plate 43 and in perpendicular relation thereto, divides slot 44 so that the beam light from the upper half of the slot reaches photomultiplier tube 37 only through the cone baffle 41 and light from the lower half of slot 44 reaches the second photomultiplier tube 38 only through the second cone baffle 42.

Referring now again to FIGURE 1 in particular, as the test pulse tracks the screen, light from the oscilloscope beam separately excites the two photomultiplier tubes, producing output signals therefrom, each of the two signals being proportional in amplitude to the respective amounts of light seen. These signals are applied to a differential amplifier 47 which amplifier produces an output signal proportional to the difference between the two input signals. The output of differential amplifier 47 is coupled through a series resistor 48 back to one of the vertical deflection plates 14 whereby the phase and magnitude of the output signal, added to the existing deflection potential, will reposition the entire beam track to vertically center the exposed narrow portion of the beam and thereby cause the two photomultiplier tubes 37 and 38 to approach equal energization. It can be seen that as the beam slowly tracks the screen 13, the differential amplifier 47 output signals continuously reposition the beam track to vertically center the exposed portion and effectively cause the pulse to trace through a fixed point on the fluorescent screen 13.

To reproduce the test pulse in enlarged form, a graphic recorder 49 of the class which traces a curve in response to an electrical input, receives a Y-coordinate input 51 signal from the output of different amplifier 47, which signal is coupled through a low pass filter 52 in which rapid changes are damped out to aid the recorder needle movement. A simultaneous X-coordinate input 53 signal is supplied the recorder 49 from the slow sweep generator 21. The recorder therefore draws a trace having a Y-coordinate determined, for each X value, by the amount of beam repositioning voltage required to maintain the beam track centered on the face of the oscilloscope screen. Such trace is therefore an arcuate representation of the beam track, and it can be seen that by the adjustment of the recorder 49 response, the pulse may be accurately reproduced with any selected degree of enlargement.

Considering now the operation of the above described embodiment the pulse to be recorded is applied to the circuit at the test source terminals 17 and 18 and the waveform displayed on the oscilloscope screen 13 in the conventional manner. The beam movement repeats at a rate determined by saw-tooth voltage source 19 and the beam slowly tracks the pulse waveform on the screen 13 through the action of the slow sweep generator 21. The tracking time used in this embodiment of the invention is 100 seconds. Manual adjustments of potentiometers 31 and 32 establishes the portion of the pulse which is to be traced by centering the beginning of that portion behind the vertical slot 44 and the horizontal baffle 46 on the face of the screen. The initial X and Y coordinate positions for the enlarged trace of the pulse are established on the graphic recorder 49. As the beam trace proceeds to horizontally track, or move across, the oscilloscope screen 13, it is incrementally exposed to photomultipliers 37 and 38 through the vertical slot 44 in plate 43. Light from the upper and lower halves of the slot 44 separately activates photomultiplier tubes 37 and 38, respectively, producing output signals therefrom proportional in amplitude to the separate amounts of light seen. These signals are applied to the differential amplifier 47 where any amplitude difference between the two is detected and amplified to produce an output signal of such magnitude and phase as to correct the difference when applied to the oscilloscope vertical deflection plates 14 by causing the beam track to vertically re-center. The output signal from differential amplifier 47 is also damped in the low pass filter 52 and applied to the Y-coordinate input 51 of graphical recorder 49 where it is received with a simultaneous X-coordinate input signal from the slow sweep generator 21. As the beam track continues the horizontal movement the foregoing process is repeated, the circuitry always acting to reposition the entire beam track to center the exposed increment of the track about the horizontal baffle and recording the amount of such repositioning needed at the corresponding points on the trace of the wave. Thus, an accurate and enlarged reproduction of the wave shape is available at recorder 49 at the end of the tracking interval.

While in the described embodiment of the invention the circuit connections and apparatus are arranged for the test pulse to track the horizontal axis of the oscilloscope screen 13, it is obvious that vertical tracking of the pulse would be equally effective. In this case the deflection and tracking voltage sources, 19 and 21, respectively, would be coupled to the vertical deflection plates 14 and 14' and the test pulse and differential amplifier 47 output would be applied to the horizontal deflection plates 16 and 16'. A 90° rotation about the horizontal axis of the slotted plate 43 and photomultiplier tubes 37 and 38 detection apparatus then will provide operation essentially as described above. It will be apparent that other adaptations are possible, for example the pulse display may be left stationary on the oscilloscope screen and mechanism provided whereby the photomultiplier tube detection apparatus and the slotted plate shielding tracks the screen at a rate with which the X-coordinate axis input of the graphic recorder is synchronized.

A modification of the foregoing structure, constituting an alternate embodiment of the invention is shown in FIGURE 3 of the drawing. Such embodiment calls for a specially fabricated oscilloscope tube and in general requires a more complex construction but results in a more compact arrangement of certain of the components of the apparatus and effects a very considerable reduction of the amount of shot noise produced in the system. In this embodiment the previously described photomultiplier tubes are replaced by electron multiplier tubes disposed within the envelope of the oscilloscope tube along with a comparable slotted plate arrangement whereby the oscilloscope beam is sensed directly. By eliminating the previous conversion of electron energy to photon energy and back to electron energy the major cause of shot noise is eliminated and a more accurate signal is delivered to the recorder.

The modified cathode ray tube 54 comprises a stepped cylindrical vacuum envelope 56 having the conventional cathode and deflector plates at the smaller end. The vertical deflection plates 14 and 14' and the horizontal deflection plates 16 and 16' are coupled to the associated circuitry in the same manner as for the previous embodiment described in connection with FIGURE 1. A circular metal plate 57 is transversely disposed within vacuum envelope 56 of the tube 54, fitting snugly against the wall thereof at a point approximately midway along the tube length. Plate 57 thereby intercepts the electron beam at this point and the fluorescent screen provided at the end wall of conventional tubes is not present. A central vertical slot 58 is provided in plate 57 which slot is divided by a horizontal baffle 59. A pair of conventional electron multiplier tubes 61 and 62 are disposed on the side of plate 57 away from the deflection plates 14 and 16 and at the upper and lower halves of slot 58, respectively, to view the electron beam of tube 54. The multiplier tubes 61 and 62 therefore function in a manner similar to the photomultiplier tubes of the previously described embodiment, that is such tubes provide signals indicative of the vertical motion of the electron beam which signals may be used to re-center the beam and to drive a graphical recorder producing a trace of the voltage variation necessary to effect such re-centering. To accomplish the foregoing, the signals from multiplier tubes 61 and 62 are led out of the vacuum tube envelope by leads 63 and 64 and applied to a differential amplifier and associated recording circuitry which may be identical to that in the first described embodiment of the invention as shown in FIGURE 1.

While the invention has been described with respect to a preferred embodiment, together with a single modification thereof, it will be apparent to those skilled in the art that numerous variations and modificatoins may be made within the spirit and scope of the invention and thus it is not intended to limit the invention except as defined in the following claims.

What is claimed is:

1. In electronic apparatus for displaying the wave shapes of fast pulses, the combination comprising a cathode ray tube having means for deflecting a cathode ray beam in a pattern representative of said fast pulse, detector tube means sensing movement of said beam pattern to either side of a fixed reference axis and producing an output signal varying in accordance therewith, scanning means acting in the direction of said axis and sequentially exposing narrow portions of said beam pattern to said detector tubes, a beam deflection control receiving signals from said detector tubes and acting on said cathode ray tube to continually center said beam pattern on said axis, and a graphical recorder having an input coupled to the output of said detector tube means for plotting a trace of the variations in output signal of said detector tube means.

2. Apparatus for determining the wave shape of fast electrical pulses comprising, in combination, a cathode ray tube having deflector electrodes for sweeping an electron beam in a pattern indicative of said wave shape, a first detector tube positioned to be actuated in response to movement of said electron beam in a first direction, a second detector tube positioned to be actuated in response to movement of said electron beam in a direction opposite to said first direction, scanning means acting along an axis perpendicular to said first direction and exposing only sequential portions of said beam sweep pattern to said first and second detector tubes, a differential signal generator receiving the outputs of said first and second detector tubes and producing a differential signal proportional to the difference therebetween, said differential signal being applied to said deflector electrodes to maintain said electron beam on said axis, and a recording device having a first input coupled to said differential signal generator output and recording variations in said differential signal as a measure of the wave shape of said pulses.

3. Electronic apparatus for producing enlarged records of the waveforms of fast pulses comprising, in combination, a cathode ray tube having means for deflecting an electron beam in a first direction according to the amplitude variation of said fast pulse and means for sweeping said beam in a second transverse direction to produce a trace corresponding to the waveform of said pulse, said cathode ray tube having further means for slow tracking of said beam trace in the sweep direction of said pulse, beam shielding means associated with said cathode ray tube having a linear beam transmissive region transverse to the direction of said tracking movement, a first detector tube and a second detector tube actuated by said electron beam and disposed to respond to said beam over separate halves of the length of said beam transmissive region, a difference amplifier receiving signals from said first and second detector tubes and producing an output according to the amplitude difference therebetween, a beam deflection control centering said beam trace in the beam transmissive region by application of said difference amplifier output to said beam deflecting means of said cathode ray tube, and a recording device having a first input coupled to said tracking means and having a second input coupled to said difference amplifier and registering variations in said difference amplifier output as a function of said tracking as an indication of said waveform.

4. In apparatus for examining the wave shape of fast electrical pulses, the combination comprising a cathode ray tube having controls for deflecting an electron beam in a trace according to the amplitude variations of said fast pulse, said cathode ray tube having a further control for rapidly sweeping said electron beam in the time direction of said pulse, said cathode ray tube having an additional control for slowly tracking said trace along the time base axis of said pulse, a first detector tube and a second detector tube sensitive to said electron beam and each positioned to respond separately to movement of said beam about a fixed reference parallel to said time base axis, shielding means transecting said cathode ray tube and provided with an electron transmissive narrow slot normal to said time base axis whereby said electron beam is transmitted to said first and second detector tubes only over a narrow segment normal to said axis, a differential amplifier receiving signals from said first and second detector tubes and producing an output signal proportional to the amplitude difference therebetween, connection means for applying said signal to said deflection control to center said beam about said fixed reference, and a recording device having a first input coupled to said differential amplifier and a second input coupled to said tracking control and tracing the variations in said differential amplifier output whereby said waveform may be examined.

5. In apparatus for graphing fast pulses in enlarged form, the combination comprising an oscilloscope having a first means deflecting an electron beam along a first axis and a second means deflecting said beam along a second transverse axis to produce a trace corresponding to the waveform of said fast pulse, said oscilloscope having a tracking signal generator for tracking said trace along said first axis at a slow rate, an opaque shielding plate disposed transverse to said beam and having a narrow slot therein aligned parallel to said second axis, a first detector tube and a second detector tube sensitive to said beam and each positioned to respond to beam energy transmitted through separate halves of the length of the slot in said plate, a differential amplifier receiving signals from said first and second detectors and producing an output proportional to the amplitude difference between said signals, means connecting said differential amplifier output to said second deflecting means of said oscilloscope to center said trace with respect to said first axis and a graphic recorder of the class tracing a curve in response to an electrical signal which recorder has a Y-coordinate input coupled to said differential amplifier and an X-coordinate input coupled to said tracking signal generator.

6. In electronic apparatus for graphing fast pulses in enlarged form, the combination comprising a cathode ray oscilloscope having a first set of deflection plates deflecting the beam of said cathode ray oscilloscope along a first axis and having a second set of deflection plates deflecting said beam along a second axis transverse to said first axis, a high frequency deflection voltage source coupled to said first set of deflection plates, a low frequency sweep voltage source coupled to said first set of deflection plates, means for applying said fast pulses to said second set of deflection plates, an opaque shielding plate disposed transverse to said beam and having a narrow slot therein aligned parallel to said second axis, a first detector and a second detector sensitive to said beam and positioned to respond to the beam transmitted through separate halves of the length of the slot in said plate, a differential amplifier receiving signals from said first and said second detectors and producing an output proportional to the amplitude difference therebetween, means coupling said differential amplifier output to said second set of deflection plates whereby the beam received by said first detector is maintained equal to the beam received by said second detector, a low-pass filter receiving said output of said differential amplifier, and a graphic recorder of the class tracing a curve in response to an electrical signal, said recorder having a Y-coordinate input coupled to the output of said low-pass filter and an X-coordinate input coupled to said low frequency sweep voltage source whereby said fast pulse waveform is reproduced.

7. In apparatus for determining the wave shape of fast electrical pulses, the combination comprising a cathode ray tube having a first means for deflecting an electron beam according to the amplitude of said fast pulse, said cathode ray tube having a second means for sweeping, in a direction transverse to that of said first deflection means, said electron beam, a pair of photoelectric tubes sensing movement of said beam pattern to either side of a fixed reference axis transecting said beam pattern, scanning means acting in the direction of said axis and sequentially exposing narrow increments of said beam to said photoelectric tubes, a beam deflection control connected from said photoelectric tubes to said first deflecting means of said cathode ray tube and acting on said first deflecting means in response to the difference between said signals from said photoelectric tubes to continually center said beam pattern on said axis, and a recorder having a first input connected to said photoelectric tubes and a second input connected to said scanning means for registering the output signals of said photoelectric means at each exposed increment of said beam pattern as an indication of said wave shape.

8. Apparatus for observing the waveform of very fast electrical pulses comprising, in combination, a cathode ray tube having a first set of deflector electrodes for sweeping an electron beam along a first axis and having a second set of deflector electrodes for deflecting said beam along a second transverse axis according to the amplitude variations of said fast pulse, a first photoelectric tube and a second photoelectric tube positioned to view said beam at opposite sides of said first axis, a slow rate tracking control coupled to said first set of deflector electrodes, a difference signal generator receiving the outputs of said first and second photoelectric tubes and producing an output indicative of the relative amplitudes of signals therefrom, a deflection control having an input coupled to the output of said difference signal generator and having an output coupled to said second set of deflector electrodes for positioning said beam with respect to said first axis in accordance with said signal generator output, and a recording device coupled at a first input to said tracking control and at a second input to said difference signal generator thereby plotting the variations in said signal generator output.

9. In electronic apparatus for studying fast electrical pulses, the combination comprising an oscilloscope having first deflecting means sweeping an electron beam in a first direction and second deflecting means guiding said beam in a second transverse direction to form a trace representative of said fast pulse, said oscilloscope having further means for tracking said trace at a slow rate in said first direction, an opaque plate disposed adjacent the face of said oscilloscope and having a narrow linear light transmissive region aligned transverse to the direction of said tracking movement, a first photomultiplier tube and a second photomultiplier tube disposed to view separate halves of the length of said light transmissive region in said plate, a differential amplifier receiving signals from said first and second photomultiplier tubes and producing an output indicative of the amplitude difference therebetween, means controlling the positioning of said trace transverse to the direction of said tracking in accordance with said differential amplifier output, and a graphic recorder having first and second inputs respectively coupled to said differential amplifier and to said tracking means and tracing variations in said output as a measure of the waveform of said fast pulses.

10. In electronic apparatus for reproducing fast pulses, the combination comprising a cathode ray tube having first means for repeatedly sweeping an electron beam along a first axis on a fluorescent screen and second means deflecting said beam along a second axis on said screen which is transverse to said first axis to produce the waveform trace of said fast pulse and having further means for slowly tracking said trace along said second axis, an opaque plate disposed substantially parallel to said screen of said cathode ray tube and having a light transmissive narrow slot therein aligned parallel to said second axis, a first photomultiplier tube and a second photomultiplier tube disposed on the opposite side of said plate from said cathode ray tube to view separate halves of the length of the slot in said plate, a differential amplifier receiving signals from said first photomultiplier tube and said second photomultiplier tube and producing an output proportional to the amplitude difference between said signals, control means applying said differential amplifier output to said second deflecting means of said oscilloscope to maintain said electron beam thereof at said first axis, and a graphic recorder connected at a first coordinate input to said differential amplifier output and at a second coordinate input to said tracking means of said oscilloscope whereby a graphical trace of the waveform of said fast pulses is produced.

11. In electronic apparatus for reproducing fast pulses in enlarged form, the combination comprising a cathode ray oscilloscope having a first set of deflection plates deflecting the beam of said oscilloscope along a first axis on a screen and having a second set of deflection plates deflecting said beam along a second axis on said screen which second axis is transverse to said first axis, a high frequency deflection voltage source coupled to said first set of deflection plates, a low frequency sweep voltage source coupled to said first set of deflection plates, means applying said fast pulse to said second set of deflection plates, an opaque plate disposed adjacent said screen of said oscilloscope and having a light transmissive narrow slot therein aligned parallel to said second axis, a first photomultiplier tube and a second photomultiplier tube positioned to view separate halves of the length of the slot in said plate, a differential amplifier receiving signals from said first and second photomultiplier tubes and producing an output proportional to the amplitude difference between said signals, means coupling said output to said second set of deflection plates, and a graphic recorder of the type producing a trace in response to an electrical signal, said recorder having a first connection to said differential amplifier output and receiving a Y-coordinate input therefrom and having a second connection means to said low frequency sweep voltage source and receiving an X-cordinate input therefrom whereby the waveform of said fast pulse is reproduced.

12. An apparatus for graphing fast electrical pulses in enlarged form, comprising in combination, a cathode ray oscilloscope having a screen and having a first set of deflection plates deflecting the beam of said oscilloscope along a first axis on said screen and a second set of deflection plates deflecting said beam along a second axis on said screen which second axis is transverse to said first axis, a high frequency deflection voltage source coupled to said first set of deflection plates, a low frequency sweep voltage source coupled to said first set of deflection plates, means for applying said fast pulses to said second set of deflection plates, an opaque plate disposed adjacent the face of said oscilloscope and having a narrow slot therein aligned parallel to said second axis, a first photomultiplier tube and a second photomultiplier tube each viewing one half the length of the slot in said opaque plate, a differential amplifier receiving signals from said first and second photomultiplier tubes and producing an output proportional to the amplitude difference between said signals, means applying said output to said second set of deflection plates of said oscilloscope whereby the amount of light received by said first photomultiplier tube is maintained equal to that received by said second photomultiplier tube, a pass filter also receiving said output of said differential amplifier, a graphic recorder of the type tracing a curve in response to an electrical signal and connected at a Y-coordinate input to said low-pass filter and at an X-cordinate input to said low frequency sweep voltage source whereby the waveform of said fast pulse is reproduced.

13. In apparatus for recording fast electrical pulses, the combination comprising a cathode ray tube with first means for sweeping an electron beam in a first direction and second means for deflecting said beam in a second transverse direction to form a pattern representative of the waveform of said pulse and having further third means effecting a tracking movement of said waveform in said first direction, a shielding plate disposed transversely within said cathode ray tube and having a narrow linear slot, a pair of electron detector tubes each disposed to receive electrons transmitted through separate halves of said slot in said shielding plate and producing an output indicative of the relative amounts of said beam about a central division of said slot in said plate, means coupling the output of said electron detector tubes to said second deflecting means of said cathode ray tube to maintain said electron beam at said central division of said slot, and a graphic recorder connected to said electron detector tubes and translating at the rate of said tracking movement to record variations between the outputs of said electron detector tubes as a measure of the wave shape of said fast pulses.

14. Apparatus for graphing the waveform of fast pulses comprising a cathode ray tube having first means for sweeping an electron beam along a first axis and having second means for deflecting said beam along a second axis transverse to said first axis in a pattern corresponding to the waveform of said fast pulse and having third means tracking said pattern along said second axis at a slow rate, a shielding plate disposed transversely within the vacuum envelope of said cathode ray tube and having a narrow slot therein aligned parallel to said second axis, a first electron multiplier tube and a second electron multiplier tube disposed within said vacuum envelope each viewing separate halves of the length of the slot in said shielding plate and generating signals indicative of movement of said electron beam away from a central position in said slot, a differential amplifier receiving signals from said first and second electron multiplier and producing an output proportional to the amplitude difference between said signals, means coupling said output of said differential amplifier to said second deflecting means of said cathode ray tube to restore said electron beam to said central position in said slot, and a graphic recorder having an X-axis input coupled to said output of said differential amplifier and a Y-axis input coupled to said tracking means of said cathode ray tube and tracing variations in said output of said differential amplifier.

15. In electronic apparatus for recording the waveform of fast pulses, the combination comprising a cathode ray oscilloscope having a first set of deflection plates deflecting an electron beam along a first axis and having a second set of deflection plates deflecting said beam along a second axis which is transverse to said first axis, a high frequency deflection voltage source coupled to said first set of deflection plates, a low frequency sweep voltage source coupled to said first set of deflection plates, means applying said fast pulses to said second set of deflection plates, a shielding plate disposed transversely within the vacuum envelope of said cathode ray oscilloscope and having a narrow slot therein aligned parallel to said second axis, a first electron multiplier tube and a second electron multiplier tube disposed within said vacuum envelope and each positioned to respond to electrons transmitted through a separate half of the length of the slot in said shielding plate, a differential amplifier receiving signals from said first and second electron multiplier tubes and producing an output proportional to the amplitude difference between said signals, means applying said output to said second set of deflection plates whereby the electron response of said first electron multiplier tube is maintained equal to that of said second electron multiplier tube, a low-pass filter connected to the output of said differential amplifier, and a graphical recorder having a Y-coordinate input coupled to said low-pass filter and an X-coordinate input from said low frequency sweep voltage source and tracing a curve in response to respective signals therefrom whereby the waveform of said fast pulse is reproduced.

References Cited in the file of this patent
UNITED STATES PATENTS

| | | |
|---|---|---|
| 2,375,159 | Wills | May 1, 1945 |
| 2,469,383 | Gibbs et al. | May 10, 1949 |
| 2,692,945 | Beaumont | Oct. 26, 1954 |